US010134502B2

(12) United States Patent
Elverud

(10) Patent No.: US 10,134,502 B2
(45) Date of Patent: Nov. 20, 2018

(54) RESISTIVE HEATER

(71) Applicant: Kim Edward Elverud, Bloomington, MN (US)

(72) Inventor: Kim Edward Elverud, Bloomington, MN (US)

( * ) Notice: Subject to any disclaimer, the term of this patent is extended or adjusted under 35 U.S.C. 154(b) by 409 days.

(21) Appl. No.: 14/802,716

(22) Filed: Jul. 17, 2015

(65) Prior Publication Data

US 2016/0021704 A1    Jan. 21, 2016

Related U.S. Application Data

(60) Provisional application No. 62/026,203, filed on Jul. 18, 2014.

(51) Int. Cl.
| | |
|---|---|
| *H01B 1/24* | (2006.01) |
| *H05B 3/14* | (2006.01) |
| *H05B 3/34* | (2006.01) |
| *H05B 3/58* | (2006.01) |

(52) U.S. Cl.
CPC .............. *H01B 1/24* (2013.01); *H05B 3/145* (2013.01); *H05B 3/34* (2013.01); *H05B 3/58* (2013.01); *H05B 2203/011* (2013.01); *H05B 2214/04* (2013.01); *Y02B 10/30* (2013.01)

(58) Field of Classification Search
CPC . H01B 1/24; H05B 3/145; H05B 3/34; H05B 3/58; H05B 2203/011; H05B 2214/04; H05B 3/146; Y02B 10/30
See application file for complete search history.

(56) References Cited

U.S. PATENT DOCUMENTS

| | | |
|---|---|---|
| 3,900,654 A | 8/1975 | Stinger |
| 5,445,308 A | 8/1995 | Nelson et al. |
| 5,586,214 A | 12/1996 | Eckman |
| 5,835,679 A | 11/1998 | Eckman et al. |
| 5,930,459 A | 7/1999 | Eckman et al. |
| 6,005,232 A | 12/1999 | Janvrin et al. |
| 6,111,234 A | 8/2000 | Batliwalla et al. |
| 6,124,579 A | 9/2000 | Steinhauser et al. |
| 6,147,335 A | 11/2000 | Von Arx et al. |
| 6,233,398 B1 | 5/2001 | Rutherford et al. |
| 6,240,231 B1 | 5/2001 | Ferrera et al. |
| 6,300,607 B1 | 10/2001 | Steinhauser et al. |

(Continued)

FOREIGN PATENT DOCUMENTS

| CN | 103842290 | 6/2014 |
|---|---|---|

OTHER PUBLICATIONS

International Search Report and Written Opinion for related PCT Application No. PCT/US15/40968 dated Dec. 8, 2015 (9 pages).

*Primary Examiner* — Shawntina Fuqua
(74) *Attorney, Agent, or Firm* — Winthrop & Weinstine, P.A.

(57) ABSTRACT

A composite formulation of the present disclosure may have conductive properties (i.e. low resistance), such that the formulation may be used in resistive heating applications. The composite may have one or more matrix materials and one or more conductive fillers. The composite may be used in the formation of resistive heaters having a number of layers, including a conductive layer, the conductive layer including the composite. Heaters of the present disclosure may be used for a number of applications including ground, floor, or roof heating, or laboratory equipment heating.

20 Claims, 6 Drawing Sheets

(56) References Cited

U.S. PATENT DOCUMENTS

| | | |
|---|---|---|
| 6,337,470 B1 | 1/2002 | Von Arx et al. |
| 6,432,344 B1 | 8/2002 | Eckman et al. |
| 6,562,021 B1 | 5/2003 | Derbin et al. |
| 8,039,774 B2 | 10/2011 | Dubey |
| 8,283,602 B2 | 10/2012 | Augustine et al. |
| 8,519,305 B2 | 8/2013 | Nakajima et al. |
| 8,558,140 B2 | 10/2013 | Hazlett et al. |
| 8,618,445 B2 * | 12/2013 | Dubey .................. H05B 3/34 |
| | | 219/213 |
| 8,664,573 B2 | 3/2014 | Shah et al. |
| 8,752,279 B2 | 6/2014 | Brittingham et al. |
| 8,770,292 B2 | 7/2014 | McClung, III |
| 8,772,676 B2 | 7/2014 | Augustine et al. |
| 8,841,588 B2 | 9/2014 | Liu et al. |
| 2005/0067406 A1* | 3/2005 | Rajarajan ............... B82Y 30/00 |
| | | 219/553 |
| 2008/0166563 A1 | 7/2008 | Brittingham et al. |
| 2009/0194525 A1 | 8/2009 | Lee et al. |
| 2009/0277897 A1 | 11/2009 | Lashmore et al. |
| 2011/0036829 A1 | 2/2011 | Fugetsu et al. |
| 2011/0056929 A1 | 3/2011 | Feng et al. |
| 2012/0118868 A1 | 5/2012 | Kim et al. |
| 2012/0125914 A1 | 5/2012 | Yue et al. |
| 2012/0177926 A1 | 7/2012 | Mann et al. |
| 2012/0280182 A1 | 11/2012 | Akita et al. |
| 2014/0034633 A1 | 2/2014 | Heintz et al. |
| 2014/0070054 A1 | 3/2014 | Burton et al. |
| 2014/0080951 A1* | 3/2014 | Raman ................. B29C 47/385 |
| | | 524/264 |
| 2014/0166638 A1 | 6/2014 | Irgens et al. |
| 2014/0263265 A1 | 9/2014 | Augustine et al. |
| 2014/0284319 A1 | 9/2014 | Feng et al. |

* cited by examiner

RESISTIVE HEATER

CROSS-REFERENCE TO RELATED APPLICATIONS

The present application claims priority to U.S. Provisional Patent Application No. 62/026,203 filed on Jul. 18, 2014, entitled Resistive Heater, the content of which is hereby incorporated by reference herein in its entirety.

FIELD OF THE INVENTION

The present disclosure relates to composite formulations for use in resistive heating. Particularly, the present disclosure relates to composite formulations having one or more conductive fillers for use in resistive heating. Additionally, the present disclosure relates to resistive heaters having a composite layer.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Resistive heaters can efficiently deliver warmth in a variety of conditions, including up to extreme or harsh conditions, and are therefore used in various applications and for various purposes. Resistive heaters operate by passing electric current through a resistor, which converts the electric energy to thermal energy. Commonly used resistors are composed of nickel-chrome or other metals or metal alloys. Another material commonly used as a resistor in resistive heating applications is ceramic. Resistors used in resistive heaters are often in the form of wires, which may be straight or coiled. In many cases, resistive heaters do not provide for evenly distributed heat throughout a heating surface, and instead heat is concentrated where the resistor wire or other material is located.

Thus, there is a need in the art for resistors for use in resistive heaters that may provide for more evenly distributed heat throughout a heating surface and that may be pliable. More particularly, there is a need in the art for composite formulations having one or more conductive fillers for use in resistive heating.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a pourable composite formulation having 50-99 percent by weight of a matrix material and more than 0 and up to 50 percent by weight of a first conductive filler. The first conductive filler may comprise carbon nanotubes in some embodiments. In some embodiments, the composite formulation may additionally have more than 0 and up to 50 percent by weight of a second conductive filler, which may include carbon fiber, and from 0-50 percent by weight of a third conductive filler, which may include graphite flake. The matrix material, in some embodiments, may include chlorobutyl rubber.

The present disclosure, in another embodiment, relates to a resistive heater having a conductive layer, a substrate layer, and a pair of connectors connected to the conductive layer. The conductive layer of the heater may include a matrix material and a conductive filler. The conductive filler may include carbon nanotubes, carbon fiber, and/or graphite flake in some embodiments. In some embodiments, the resistive heater may have a heated surface and an unheated surface. In some embodiments, the resistive heater may be configured to at least partially wrap around a glass container. In other embodiments, the resistive heater may have an opening configured to receive a glass container. The resistive heater may also include one or more sensors for detecting one or more properties of contents of the glass container.

The present disclosure, in yet another embodiment, relates to a method for manufacturing a resistive heater, the method including the steps of forming a conductive layer having a matrix material and a conductive filler, at least partially surrounding the conductive layer with an insulating material, and connecting the conductive layer to a controller via one or more conductors, wherein the controller regulates power to the resistive heater. In some embodiments, the conductive filler may include carbon nanotubes, carbon fiber, and/or graphite flake. The matrix material may include chlorobutyl rubber.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
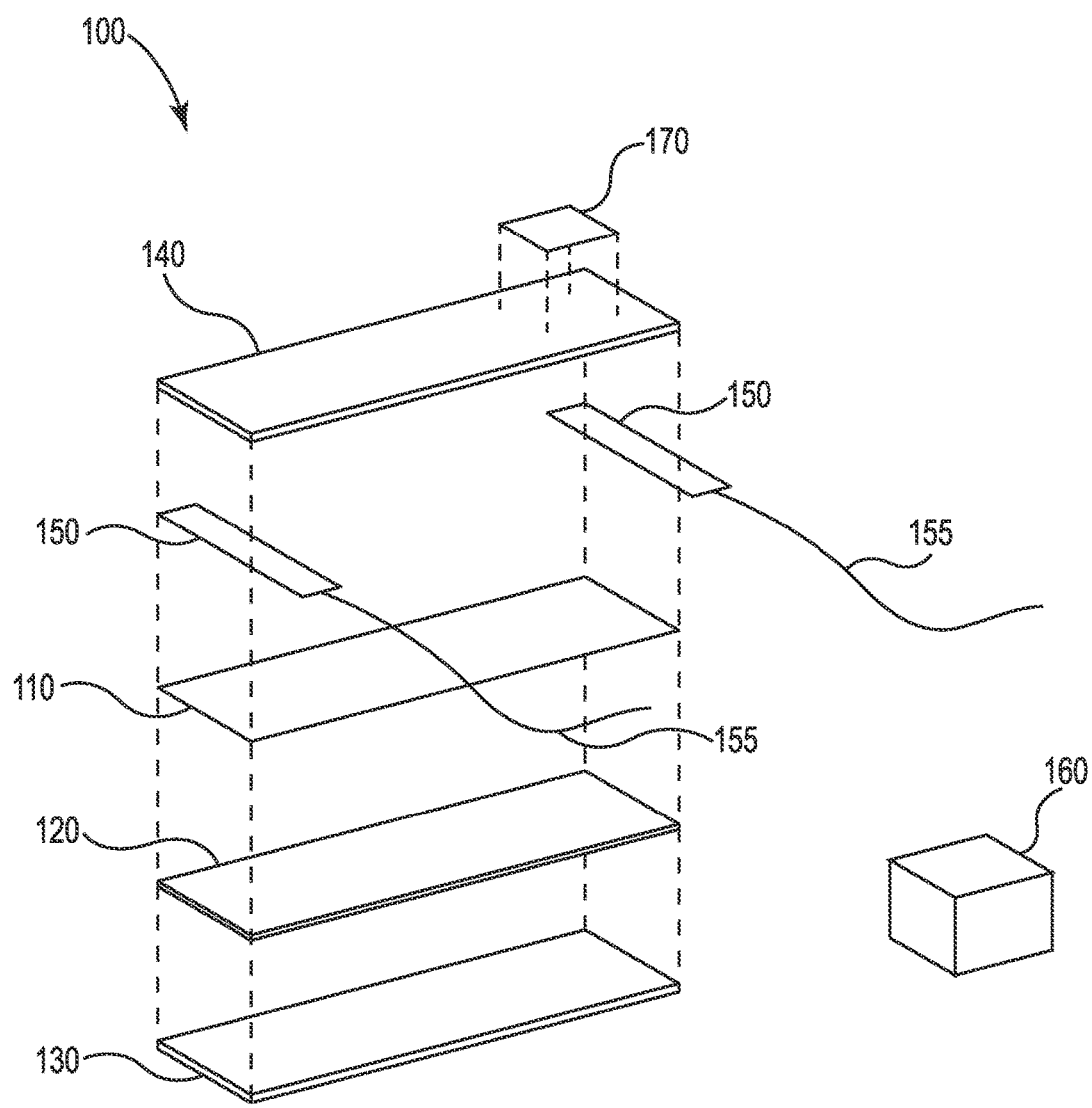
FIG. 1 is an exploded view of a resistive heater according to some embodiments of the present disclosure.

The present disclosure relates to novel and advantageous composite formulations for use in resistive heaters. The present disclosure additionally relates to novel and advantageous resistive heaters utilizing a composite layer.

For purposes of the present disclosure:

The term "thermal conductivity," along with any other conventional definition or understanding by one of skill in the art, is meant to include the ease with which thermal energy is conducted from one component to another component.

The term "thermal emissivity," along with any other conventional definition or understanding by one of skill in the art, is meant to include the ease with which thermal energy is radiated from one component to another item.

The term "electrical conductivity," along with any other conventional definition or understanding by one of skill in the art, is meant to include the ease with which electrical energy is conducted from one component to another component.

The term "maximum temperature," along with any other conventional definition or understanding by one of skill in the art, is meant to include the temperature above which the component will likely be permanently damaged.

The term "material compatibility(ies)," along with any other conventional definition or understanding by one of skill in the art, is meant to include the ability of the component to be in contact with or to bond with other materials.

The term "input power," along with any other conventional definition or understanding by one of skill in the art, is meant to include the amount of electrical power put into a component in order for the system to operate.

The term "output power," along with any other conventional definition or understanding by one of skill in the art, is meant to include the amount of electrical power that comes out of a component in order for the system to operate.

A composite formulation of the present disclosure may generally have conductive properties (i.e. low resistance), such that the composite may be used in resistive heating applications. A composite formulation of the present disclosure may be, in some embodiments, a polymeric composite. In general, a composite formulation of the present disclosure may have one or more matrix materials and one or more conductive fillers. In addition, a composite formulation of the present disclosure may include one or more additives.

More specifically, a composite formulation of the present disclosure may include one or more matrix materials, which may generally form a matrix for the composite. Matrix materials may include, but are not limited to, natural or synthetic polymers, such as halogenated or non-halogenated butyl rubbers, nitrile rubbers, latex, silicone rubbers, fluoroelastomers, urethanes, ethylene propylenes, plastics, natural or synthetic fibers such as cotton, wool, other cloth, fiberglass, or polyester, or any combinations thereof. In some embodiments, composite formulations of the present disclosure may comprise between 30-99 percent by weight with respect to total solids of one or more matrix materials. More particularly, a composite formulation of the present disclosure may comprise between 40-99 percent by weight with respect to total solids of one or more matrix materials. Even more particularly, a composite formulation of the present disclosure may comprise between 50-99 percent by weight with respect to total solids of one or more matrix materials. In some embodiments, for example, a composite formulation of the present disclosure may comprise approximately 60-80 percent by weight or may comprise approximately 90-99 percent by weight with respect to total solids of one or more matrix materials. In other embodiments, however, any suitable amount of one or more matrix materials may be included in composite formulations of the present disclosure.

A composite formulation of the present disclosure may additionally include one or more conductive fillers, which may impart conductivity to the matrix of the composite. Examples of conductive fillers include, but are not limited to, graphite, graphene, carbon nanotubes (CNTs), carbon fibers, carbon black, metal nanoparticles, metal nanowires, metal powders, and intrinsically conductive polymers, such as polythiophenes or polyaniline. Other suitable conductive fibers, nanomaterials, or other fillers that impart conductivity may be used according to various embodiments. Materials used as conductive fillers may, in some embodiments, impart additional properties to or have other effects on the composite. For example, graphite may be used as a conductive filler to impart conductivity, and may additionally improve UV resistance of the composite, increase hardness, and/or reduce surface tack. In some embodiments, composite formulations of the present disclosure may comprise between 0-70 percent by weight with respect to total solids of each of one or more conductive fillers. More particularly, composite formulations of the present disclosure may comprise between 0-60 percent by weight with respect to total solids of each of one or more conductive fillers. Even more particularly, composite formulations of the present disclosure may comprise between 0-50 percent by weight with respect to total solids of each of one or more conductive fillers. For example, in some embodiments, a composite formulation of the present disclosure may comprise approximately 5-10 percent by weight with respect to total solids of each of one or more conductive fillers. In other embodiments, however, any suitable amount of one or more conductive fillers may be included in composite formulations of the present disclosure. In some embodiments, conductivity of the composite formulation may generally be tunable based on the ratio of matrix material to conductive fillers. For example, a higher amount of conductive fillers with respect to matrix material may generally increase conductivity of the composite, according to some embodiments. In this way, it may be desirable to control or monitor the ratio of matrix materials to conductive fillers.

A composite formulation of the present disclosure may also include one or more additives, which may modify or affect one or more properties, or have one or more effects on, or impart one or more characteristics to the composite. For example, additives may affect and/or may be used to tune such properties as curing of the composite, vulcanization rates, molding properties, casting properties, or other properties such as maximum operating temperature, thermal stability, minimum operating temperature, flexibility, elasticity, hardness, tackiness, density, wear resistance, durability, thermal conductivity, electrical conductivity, chemical resistance, UV-resistance, processability, water resistance, fire retardancy, hydrophobicity, oleophobicity, or porosity. Examples of additives include, but are not limited to, sulfur, zinc oxide, stearic acid, plasticizers, defoaming agents such as fluorosilicones, crosslinking agents such as thiurams, dithiocarbamates, or thiazoles, mineral fillers such as clay, talc, or calcium carbonate, metal oxides, oils, silicates, antioxidants, tackifying agents, curing agents, release agents, and adhesion promoters. In some embodiments, composite formulations of the present disclosure may have between 0-15 percent by weight with respect to total solids of each of one or more additives. More particularly, composite formulations of the present disclosure may have between 0-10 percent by weight with respect to total solids of each of one or more additives. Even more particularly, composite formulations of the present disclosure may have between 0-5 percent by weight with respect to total solids of each of one or more additives. In other embodiments, however, any suitable amount of one or more additives may be used in a composite formulation of the present disclosure. In some embodiments, composite formulations of the present disclosure may have no additives in addition to the matrix material(s) and conductive filler(s).

In some embodiments, a composite formulation of the present disclosure may include, but is not limited to, the following components.

| Component | Wt. % w.r.t. total solids |
|---|---|
| Chlorobutyl Rubber | 50-99 wt. % |
| Zinc Oxide | 1-5 wt. % |
| Stearic Acid | 0-5 wt. % |
| Fluorosilicone | 0-5 wt. % |
| Carbon Nanotubes | 0-50 wt. % |
| Carbon Fiber | 0-50 wt. % |
| Graphite Flake | 0-50 wt. % |

For example, a particular embodiment may comprise between 65-85 percent by weight with respect to total solids of chlorobutyl rubber, and 1-15 percent by weight with respect to total solids of each of carbon nanotubes, carbon fiber, and graphite flake. A composite formulation of the present disclosure may generally be tuned, as discussed above, for strength, flexibility, durability, density, heating capability, and/or other properties to accommodate various desired or required end uses.

A composite of the present disclosure may be processed or homogenized using any suitable mixing method, such as but not limited to, two-roll milling, ball milling, three-roll milling, planetary mixing, extrusion mixing such as screw extrusion, ultrasonication, centrifugal mixing, high shear mixing, banbury mixing, sigma blade mixing, or any combination thereof. The composite may be processed with the use of thermal energy in some embodiments. In other embodiments, the composite may be processed by dissolution in a solvent, the composition of which may depend on the matrix material used in the composite formulation. The solvent may blend isomers and/or benzene derivatives with heterocyclic and/or organic compounds, according to some embodiments. In some embodiments, the composite may be processed using an activated cure system, such as a two-part or UV-cure silicone for example. In some embodiments, for example where a solvent is used for processing, the composite may be tape cast and dried to remove the solvent after mixing, and then heat-cured in some embodiments. Additional or alternative processing and mixing methods may be used in various embodiments. It is additionally understood that a combination of processing methods and/or a combination of mixing methods may be used.

A composite of the present disclosure may be applied to various surfaces and may be generally pourable in some embodiments, at least until it has cured or dried. That is, the composite may be viscous in some embodiments prior to curing or drying. Upon curing or drying, the composite may form a solid substance. In some embodiments, the composite may be cast, painted, sprayed, or dipped into various shapes and/or onto or over various surfaces in embodiments. In various embodiments, for example, the composite may be dip coated, air knife coated, knife over rolled (using for example a doctor blade or tape casting), Meyer rod coated, pad printed, ink rolled, drop casted, spin coated, screen printed, ink jet printed, curtain coated, hot melted, rotary screened, slot-died, roll coating press fitted, laminated, spray coated, or printed using such processes as gravure, rotogravure, flexography, or offset. Finishing methods such as calendering may be used as well in some embodiments. Other methods of forming the composite into a shape, depositing the composite onto a surface, and/or finishing may be used in embodiments.

Using any of the methods just listed or any other suitable method, a composite of the present disclosure may be formed into any suitable solid shape. For example, the composite may be poured, cast, sprayed, or otherwise formed into a solid or mesh sheet or mat of any suitable thickness. In some embodiments, the composite may be formed or molded into any desirable three-dimensional shape. The composite may have any suitable level of hardness and/or flexibility, which may be tuned based on the ratio of base composite ingredients and/or the type and amount of one or more additives, as described above. For example, where a mat or sheet is desired, the composite may be designed with relatively high flexibility or pliability so that the mat or sheet may be rolled or folded, for example. In other embodiments, a stiff structure may be desired with low flexibility and/or relatively high hardness or density.

Once the composite is formed into a solid shape, the composite may act as a resistor. That is, when an electric current is passed through the composite, the composite may act to convert the electric energy into thermal energy. More specifically, when an electric current is passed through the composite, it may warm or increase in temperature. The maximum temperature to which the composite may reach may be tuned or controlled through the use of thermally stable materials. For example, one or more fillers, such as iron oxide, silica, graphite, or carbon nanotubes, may improve thermal stability of the composite. Similarly, one or more thermally stable matrix material such as polyimides, silicones, or fluoroelastomers, may be used to tune or control the maximum temperature to which the composite may reach. For example, in some embodiments, it may be desirable to ensure that the composite cannot generally reach a temperature higher than 100 degrees Fahrenheit when it converts an electric current to thermal energy. In other embodiments, the composite may be configured to reach temperatures several times that required to boil water, for example. In other embodiments, the composite may be configured to any suitable maximum temperature or temperature range.

A composite of the present disclosure may be utilized in the manufacture of a heater. A heater of the present disclosure may be used in various applications and may be manufactured in various forms. A heater of the present disclosure may be utilized for generally any application where a heating apparatus would or could be used or be desirable. A heater of the present disclosure may be configured for use in indoor and/or outdoor applications, and in wet and/or dry conditions. In embodiments, a heater of the present disclosure may be a source of auxiliary heat and/or primary heat. A heater of the present disclosure may provide radiant and/or direct heat. In some embodiments, a heater of the present disclosure may be used with generally large surface areas such as to heat indoor or outdoor floors, ground surfaces, or roof surfaces, for example. In other embodiments, a heater of the present disclosure may be used with generally small surface areas, such as for heating test tubes, beakers, or other containers or glassware for example. These examples are not limiting, and a heater of the present disclosure may have generally any size and may be suitably configured for any number of applications.

Figure 2:
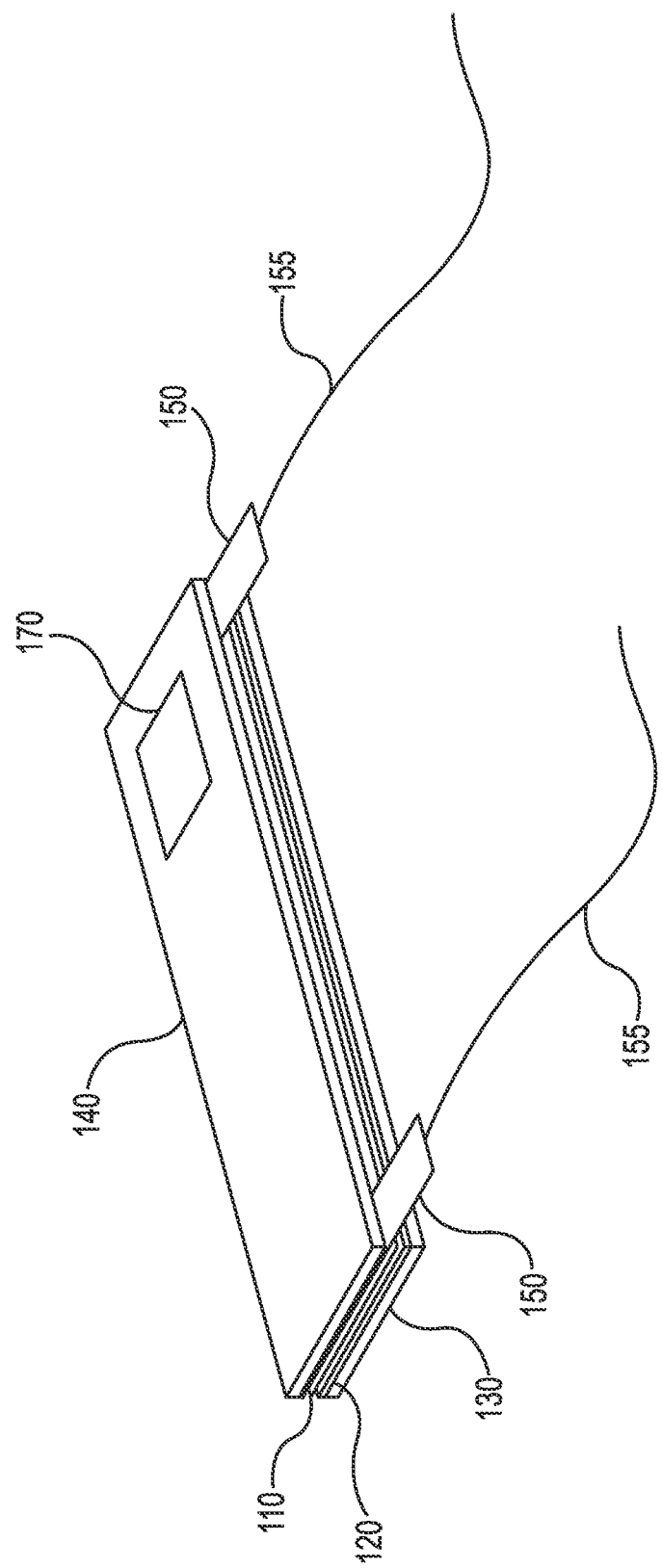
FIG. 2 is a perspective view of a resistive heater according to some embodiments of the present disclosure.

A heater 100 according to one embodiment of the present disclosure is shown for example in FIGS. 1 and 2. As shown, a heater 100 of the present disclosure may have a number of layers, such as a conductive layer 110, a substrate layer 120, a top layer 140, and/or a bottom layer 130. Additionally, the heater 100 may include a pair of conductors 150 and interconnects 155, which may connect to a controller 160. The heater may also include one or more sensors 170 in some embodiments.

The heater 100 may have a conductive layer 110 in some embodiments. The conductive layer 110 may be composed, at least in part, of a composite of the present disclosure. That is, the conductive layer 110 may include one or more matrix materials and one or more conductive fillers, as described above, as well as any other additives as described above. The conductive layer 110 may have conductive filler(s) spread or dispersed throughout the entirety of the conductive layer in some embodiments. In other embodiments, the conductive filler(s) may be spread or distributed in a pattern throughout the conductive layer 110. For example, the conductive layer 110 may generally have a pattern of zones without conductive filler(s) and heating zones having conductive filler(s). The heating zones containing conductive filler(s) may be patterned throughout the conductive layer 110 in any suitable pattern, and the heating zones may be any suitable size.

In some embodiments, the heater 100 may include a substrate layer 120. The substrate layer 120 may be adjacent to the conductive layer 110. In some embodiments, the conductive layer 110 may be applied to or deposited on the substrate layer 120. The substrate layer 120 may be electrically non-conductive. The layer 120 may include such materials as, but not limited to, polymer films such as polyethylene terephthalate (PET), polyimides such as KAPTON™, woven or non-woven materials such as fiberglass, nylon, carbon fiber, or polymers such as polyolefins or polyimides, or any suitable combinations thereof. Other possible materials may include leather, paper, glass, or ceramic, or non-conductive textiles, plastics, rubbers, building construction materials, or paving materials, or any suitable combinations thereof. In other embodiments, the substrate layer 120 may comprise any suitable material or suitable combination of materials. The substrate layer 120 may generally comprise materials that are compatible with the conductive layer 110.

In some embodiments, the heater may include an outer layer, such as for example, a top layer 140 and/or a bottom layer 130. It is to be understood that, as used herein, the terms "top layer" and "bottom layer" are used for reference to the figures, and do not necessarily signify a top or bottom positioning of the heater 100. A heater of the present disclosure, a top layer, and a bottom layer, may generally have any suitable orientation and positioning. Furthermore, a heater of the present disclosure may be constructed without a top layer and/or without a bottom layer. For example, the heater 100 may have a conductive layer 110 placed over a substrate layer 120, without additional layers in some embodiments. As described below, where the heater 100 includes a top layer 140 and/or bottom layer 130, the layer(s) may generally comprise heated surfaces and/or unheated surfaces.

In some embodiments, the heater 100 may include a heated surface, which may be an outer layer in some embodiments, such as for example, the top layer 140 and/or the bottom layer 130. In some embodiments, the heated surface may be a portion of an outer layer, such as a portion of the top layer 140 and/or bottom layer 130. The heated surface may have thermal conductivity in some embodiments, allowing heat generated at the conductive layer 110 to transfer to and/or flow through the heated surface. In this way, the heated surface may become warm during operation of the heater 100. The heated surface may be electrically non-conductive, according to some embodiments, such that electricity flowing through or into the conductive layer 110 and/or other layers of the heater 100 may remain internal to the heater, for example. The heated surface may generally provide for a barrier between the conductive layer 110 and the environment in which the heater 100 is placed. In this way, the heated surface may generally protect the conductive layer 110 and/or conductors 150 from the environment, and/or protect the environment and users from the conductive elements of the heater. Additionally or alternatively, the heated surface may help to insulate thermal and/or electrical energy within the heater 100. The heated surface may provide protection for the conductive layer 110, conductors 150, and/or other layers described herein from environmental, electromagnetic, chemical, or other interference. The heated surface may be comprised of materials such as plastic, PET film, insulating foam, rubber, fiberglass, Teflon, silicon, or nylon, or any suitable combinations thereof. The heated surface may comprise other suitable materials or suitable combinations thereof in other embodiments. The heated surface may, in some embodiments, include multiple layers. For example, an outer layer may include environment resisting materials and/or properties, such as anti-freezing properties, for example. Where the heater 100 is configured for radiant heating applications, the heated surface and/or an outer layer of the heated surface may have thermal emissivity properties.

In some embodiments, the heater 100 may have an unheated surface or relatively unheated surface, which may be an outer layer in some embodiments, such as for example, the top layer 140 and/or the bottom layer 130. In some embodiments, the unheated surface may be a portion of an outer layer, such as a portion of the top layer 140 and/or bottom layer 130. The unheated surface may be thermally non-conductive, and thus when the heater 100 is in operation, the unheated surface may generally remain nearer to room temperature in contrast to a heated surface, discussed above. The unheated surface may generally provide for a barrier between the conductive layer 110 and the environment in which the heater 100 is placed. In this way, the unheated surface may generally protect the conductive layer 110 and/or conductors 150 from the environment, and/or protect the environment and users from the conductive elements of the heater. Additionally or alternatively, unheated surface may help to insulate thermal and/or electrical energy within the heater 100. The unheated surface may provide protection for the conductive layer 110, conductors 150, and/or other layers described herein from environmental, electromagnetic, chemical, or other interference. The unheated surface may be comprised of materials such as leather, paper, glass, ceramic, or textiles, plastics, rubber, building construction materials, or paving materials that are not generally thermally conductive, or any suitable combinations thereof. In other embodiments, the unheated surface may be comprised of any other suitable materials. The unheated surface may, in some embodiments, include multiple layers. For example, an outer layer may include environment resisting materials and/or properties, such as anti-freezing properties, for example. In one embodiment, the top layer 140 may be a heated surface while the bottom layer 130 may be an unheated surface; however, such configuration is not required by all embodiments of the present disclosure.

In embodiments, the heater 100 may comprise additional layers such as adhesive layers, decorative layers, other thermally conductive and/or electrically conductive layers, other substrate layers, other insulating layers, supporting layers, or other suitable layers. Differing layers may be used for various purposes within the heater 100 such as, but not limited to, imparting electrical connectivity, changing heat flow profiles, protecting the conductive composite from environmental, electromagnetic, chemical, or other interference, counterfeit protection, or improving the commercial or marketing appeal of the heater. According to some embodiments, the layers of the heater 100 may be glued, sewn, or otherwise adhered to one another using any suitable method. For example, the layers may be laminated using adhesives known in the art, mechanical or thermal interactions, or by any other suitable means of adhesion.

In some embodiments, the heater 100 may comprise one or more sensors 170. The sensor 170 may measure or sense such physical attributes as temperature, compression, motion, voltage, current, impact, moisture, orientation, or position, for example. The sensor 170 may measure one or more physical parameters of the environment in which the heater 100 is placed, such as but not limited to, air temperature, water temperature, humidity, light, sunlight, wind, precipitation, sound, movement, time, time of day, day of week, date, or location. A temperature sensor, for example, may sense one or more temperatures, such as a temperature of the conductive layer 110, a temperature of the heated surface, and/or a temperature of any material or space affected by the heater 100. The sensor 170 may convert the sensed physical attribute into an electrical signal, for example, which may be communicated to the controller 160 and/or another device in some embodiments. While shown in FIGS. 1 and 2 on an outer surface of the heater 100, the temperature sensor and/or any other sensor may be located internally within or external to the heater, and may be generally coupled to or remote from the heater. The sensor 170 may, in some embodiments, provide a reading of the measured or sensed property. In some cases, the reading may be provided locally at the sensor 170, or the reading may be communicated to another device or location via a wired or wireless connection.

In some embodiments, the conductive layer 110 may be connected to a controller 160. The controller 160 may function as an interface for regulating power to the heater 100 and/or monitoring various properties such as temperature of the heater. In some embodiments, the controller 160 may provide for such controls as an on or on/off switch, a temperature setting or control, a timer, and/or other suitable features. The controller 160 may receive information, such as temperature information, from one or more sensors 170 in some embodiments via a wired or wireless connection. The controller 160 may allow for manual, partially automated, and/or automated control of the heater 100. Partial or fully automated control of the heater 100 may rely at least in part on information received from the one or more sensors 170. For example, the controller 160 may operate to maintain the temperature of the conductive layer 110, heated surface, or material or air affected by the heater 100 at a particular or pre-set temperature. In such cases, the controller 160 may regulate or adjust input power to the heater 100 based on feedback received from one or more sensors 170. In other embodiments, the controller 160 may be configured to act on any suitable combination and/or sequence of events and/or readings detected by the one or more sensors 170. The controller 160 may provide for additional functionality in some embodiments, such as providing for a wireless connection for controlling and/or monitoring the heater 100 remotely and/or automatically. For example, the controller 160 may include a Bluetooth, infrared, wireless adapter, or other connectivity device. The controller 160 may, in some embodiments, send and/or receive communications over Bluetooth, Wi-Fi, Internet, cellular, or plain old telephone service (POTS), or other communication systems. In such embodiments, a remote device such as a smart phone or a remote server running a control application may be used to control and/or monitor the heater 100 remotely. In some embodiments, a separate control system such as a home automation system may control and/or monitor operation of the heater 100. Although illustrated external to the heater 100, the controller 160 may be located internal to or integrated within or on the heater, or located external to the heater. For example, in some embodiments, the controller 160 may be integrated in an outer layer such as a heated surface or unheated surface of the heater 100. In some embodiments, a heater may operate without a controller 160. For example, a heater may be operated by directly connecting the interconnects 155 to a power supply, for example.

The controller 160 may be configured to regulate or adjust the input power to the heater 100 by amplitude modulation of AC and/or DC voltage, amplitude modulation of an AC and/or DC current, pulse width modulation of an AC and/or DC voltage, or pulse width modulation of an AC and/or DC current, or any suitable combinations thereof. The power output by the controller 160 may generally be less than or equal to the maximum input power of the conductive layer 110. Likewise, the power input to the controller 160 may generally be less than or equal to the power available from the power supply. The controller 160 may regulate power and/or monitor the operation of one heater 100, or multiple heaters, which may or may not be interconnected. That is, multiple heaters 100 may be regulated and/or controlled by the controller 160 as one unit, or separately as multiple units. The controller 160 may similarly regulate and/or monitor multiple zones or micro zones of a heater 100. The zones or micro zones may be regulated and/or controlled as one unit, or separately as multiple units.

In some embodiments, the conductive layer 110 may be connected, directly or indirectly, to a power supply. Examples of power supplies may include, but are not limited to, a building electrical system by way of a 110-120 V electrical outlet, for example, an automotive electrical system, a portable power source such as one or more batteries, or other suitable power supplies. In some embodiments, the controller 160 may be a power supply, such as a battery power supply, for example. In other embodiments, the controller 160 may facilitate a connection between the heater 100 and the power supply. In still other embodiments, the power supply may be separate from the controller 160. In any case, the controller 160 may regulate input power to the heater 100.

The heater 100 may comprise any suitable electrical connectors in some embodiments. Such electrical connectors may provide for such subsystems as temperature control of the heater, monitoring of various properties regarding the heater and/or other devices, wireless communication, and/or electrical connectivity. For example, buses or conductors 150 may connect the conductive layer 110 to the power supply, either directly or via the controller 160. In some embodiments, a pair of conductors 150 such as a negative conductor 150a and a positive conductor 150b may be applied to the conductive layer 110. Each conductor 150 may be coupled to, adhered to, or integrated in the conductive layer 110 by any suitable means. Each conductor 150 may be coupled, adhered, or integrated between, for example, the conductive layer 110 and the heating surface, between conductive layer and substrate layer 120, or between the conductive layer and an unheated surface. The conductors 150 may generally have any suitable shape and/or size, and may generally take any suitable form, such as but not limited to, ink, paint, foil, braids, wires, sheets, bars, pipes, or plates, or any combinations thereof. For example, the conductors 150 may be straight or curved sheets or bars of material in some embodiments. The conductors 150 may additionally be placed at various locations and with various positioning on or within the conductive layer 110. For example, the conductors 150 may be positioned parallel and equidistant from a center point of the conductive layer 110, in some embodiments, which may yield relatively even heat distribution between the conductors. In other embodiments, the conductors 150 may be positioned nonparallel and/or at different distances from a center point of the conductive layer 110, which may yield relatively uneven or contoured heat distribution between the conductors. Multiple sets of conductors 150 may be coupled to, adhered to, and/or integrated in the conductive layer 110 in some embodiments. For example, multiple pairs of conductors 150 may be used to create heating zones or micro heating zones, which may be heated separately, and in some cases individually controlled. Each pair of conductors 150 may establish a heating zone or micro heating zone, for example. The conductors 150 may comprise conductive materials such as, but not limited to, copper, aluminum, other conductive metals, graphene, or any combinations thereof.

In some embodiments, one or more conductive traces may be coupled to, adhered to, printed on, or integrated in the conductive layer 110 to facilitate distribution of electrical current through the layer and/or between the conductors 150. In some embodiments, for example, the conductive traces may be held in place with mechanical pressure. In some embodiments, the conductive layer 110 may be formed or deposited over or around the traces. For example, the conductive traces may be bonded to the substrate layer 120, and the conductive layer 110 may be applied to the substrate layer, over the traces. The conductive traces may be wire traces, for example, and may comprise conductive materials such as copper, aluminum, silver, or other conductive materials, or combinations thereof. In some embodiments, the conductive traces may comprise a composite of the present disclosure, having a matrix material and one or more fillers. In some embodiments, the conductors 150 may be applied over, coupled to, or integrated with the conductive traces. For example, the conductors 150 may be mechanically applied to the traces. Additional or alternative electrical components may be coupled to, adhered to, or integrated within the conductive layer 110 or other components of the heater 100.

In some embodiments, the conductors 150 may be connected to the power supply and/or controller 160 by one or more wires or interconnects 155. The interconnects 155 may provide a barrier between the electrical energy of the heater 100 and the environment, in some embodiments, and therefore may be at least partially electrically insulating. The interconnects 155 may comprise conductive materials such as copper, aluminum, or other conductive metals, or combinations thereof. The interconnects 155 may additionally or alternatively include elements such as, but not limited to, a plug and jack, terminal block, barrier strip, wire nut, insulation displacement connection, crimp terminal, solder, or weld, or any suitable combinations thereof.

A heater of the present disclosure may be assembled using a roll to roll process, batch process, or other suitable manufacturing processes. Additionally, a heater of the present disclosure may be modular in length and/or width and may allow for interconnectivity with additional heaters or other electrical devices, in some embodiments. Interconnectivity of multiple heaters of the present disclosure may be accomplished by, for example, physically coupling the heaters to one another by way of electrical wires connected to the conductive layer of each interconnected heater, for example. Interconnectivity may allow, for example, a single power source to supply power to multiple heaters of the present disclosure and/or for multiple heaters to be controlled on one control box.

A heater of the present disclosure may be configured for applications of heating a relatively large area. Generally, a large area heater may be formed in the shape of a solid or mesh sheet or mat. For example, a large area heater may be between 5-30 feet in length and/or width in some embodiments. In other embodiments, a large area heater may have any suitable length and width. A large area heater may have any suitable thickness. In some embodiments, a large area heater may have a thickness of between 0.5-4 inches. A large area heater may be configured for interconnection with another heater, such that multiple large area heaters may be interconnected in some embodiments. A large area heater may be configured for indoor and/or outdoor use and for a variety of applications. In some embodiments, a large area heater may have a maximum temperature capability or setting that is relatively low, such that it may be safe to touch with bare skin. In other embodiments, a large area heater may have any suitable temperature capabilities and settings.

A large area heater may be used for various indoor and/or outdoor applications, and may be intended for relatively permanent placement or temporary use. A large area heater may be used in a residential, commercial, or other setting. For example, in some embodiments, a large area heater may be used on, under, or within a ground or flooring surface in order to heat the ground or flooring surface and/or warm the area above the ground or flooring surface. In some embodiments, a large area heater may cover a relatively small surface area, such that it may be readily transportable, for example, similar to a floor rug. In other embodiments, a large area heater may cover a relatively large surface area and be configured to fill a room or large enclosure for example, in which case the heater may be configured for relatively permanent placement. In some embodiments, a large area heater may be configured to be placed over the ground or flooring such as like a rug for example. In this manner, the large area heater may be generally portable. In other embodiments, a large area heater may be installed within or beneath a ground or flooring surface, such that it may warm the ground or floor from beneath and in some cases radiate heat into the above area. In some outdoor applications, a large area heater may assist with melting snow and ice and/or preventing snow or ice buildup on a ground or floor surface. Exemplary applications where a large area heater may be used on or beneath a ground or floor surface include, but are not limited to: small or large animal enclosures, plant greenhouses, driveways, walkways, garages, outdoor decks or patios, and indoor floors or carpeting. In other embodiments, a large area heater may be installed on or under soil to warm the soil surrounding plants in the winter, for example. In such embodiments, the large area heater may have a mesh configuration, for example, with openings allowing plants to grow and water to flow through the heater.

A large area heater used for floor or ground heating may be controlled by or may be responsive to pressure, in some embodiments. That is, the heater, or portions of the heater such as differing zones, may be configured to switch on or warm in response to pressure being applied to a surface of the heater or floor or ground surface above the heater. In such embodiments, the heater may be coupled with a pressure sensor or force sensor such as a force sensitive resistor, piezoelectric sensor, or other suitable force or pressure sensor for example. In this way, a large area heater may switch on and/or warm to a particular temperature when pressure from, for example, people or animals in the vicinity of the heater, is sensed.

Large area heaters may also be used in various other embodiments. For example, a large area heater may be used in construction to assist with curing concrete or masonry, for example. In additional embodiments, a large area heater may be placed over, beneath, or within a roofing surface in order to assist with snow and ice removal and/or prevention, for example. A large area heater may be immersed in bodies of liquid, such as livestock water tanks or swimming pools, for example. In such embodiments, a large area heater may additionally be combined with a machine that circulates throughout the body of water, for example to mitigate freezing or warm the liquid. A large area heater may be used to warm irrigation systems in some embodiments. A large area heater may additionally be used in vehicles such as motor vehicles, powersport machines, boats, or other vehicles, to warm the floors, engines, and/or interior of the vehicle. A large area heater may be used to assist with winterizing a vehicle, for example. In vehicles or other applications, a large area heater may also be incorporated into seating of the vehicle, such as incorporated into, on, or over the seat fabric. In the case of vehicle uses, a large area heater may be plugged into the vehicle's auxiliary power outlet for example, or may be connected to the vehicle's main electrical system. Without being exhaustive, specific examples of large area heater applications follow.

A large area heater may be used for relatively permanent indoor floor heating, in which a sheet or roll product may be installed underneath a finished flooring in a living space, for example. In some embodiments, the indoor floor heater may be controlled as a single unit, or may be divided into zones separately controlled, for example, based on floor or air temperature in or above each zone. Similarly, a large area heater may be used for portable indoor floor heating, in which a portable mat may be placed in an indoor area to provide temporary heat in the area. The portable indoor floor heater may be operated as an individual unit based on mat temperature in some embodiments. A large area heater used for portable or relatively permanent indoor floor heating may use thermal conduction as a primary method to transfer thermal energy from the heater. An upper or heated layer such as a top layer of the heater may therefore include materials with high thermal conductivity.

A large area heater may be used for relatively permanent roof deicing, in which a sheet or roll product may be installed beneath a roofing material on a building, for example. In some embodiments, the roof deicer may be controlled as a single unit, or may be divided into zones separately controlled, for example, based on roof temperature and/or the presence of snow or ice in each zone. Similarly, a large area heater may be used for portable roof deicing, in which a mat may be placed on an area of a roof to provide temporary deicing in the area. The portable mat may be controlled as a single unit based on mat temperature and/or the presence of snow or ice in the area. A large area heater used for relatively permanent or portable roof deicing may use thermal conduction as a primary method to transfer thermal energy from the heater. An upper or heated layer such as a top layer of the heater may therefore include materials with high thermal conductivity.

A large area heater may be used for relatively permanent pavement deicing, in which a sheet or roll product may be installed beneath or within an outdoor pavement, for example. In some embodiments, the pavement deicer may be controlled as a single unit, or may be divided into zones separately controlled based on, for example, pavement surface temperature and/or the presence of snow or ice in each zone. Similarly, a large area heater may be used for portable pavement deicing, in which a mat may be placed on an area of pavement to provide temporary deicing in the area. The portable mat may be controlled as a single unit based on mat temperature and/or the presence of snow or ice in the area. A large area heater used for relatively permanent or portable pavement deicing may use thermal conduction as a primary method to transfer thermal energy from the heater. An upper or heated layer such as a top layer of the heater may therefore include materials with a relatively high thermal conductivity.

A large area heater may be used as an indoor or outdoor radiant heater, in which a portable space heater may be placed in an indoor or outdoor area to provide temporary heat in the area, for example. The heater may be controlled as a single unit based on, for example, air temperature in some embodiments. An indoor or outdoor radiant heater may use thermal radiation as a primary method to transfer thermal energy from the heater. An upper or heated layer such as a top layer of the heater may therefore use materials with a relatively high thermal emissivity.

Generally, a large area heater may be configured for indoor and/or outdoor use. Where a large area heater is configured for indoor use, the heater may be configured to operate safely in an ambient temperature range of 50-120 degrees Fahrenheit in some embodiments. Without limiting the various embodiments of the present disclosure to any particular output, an indoor use heater may, in some embodiments, have a power output of up to about 12 W/sq-ft. Where a large area heater is configured for outdoor use, the heater may be configured to operate safely in an ambient temperature range of −40 to 120 degrees Fahrenheit, in some embodiments. Without limiting the various embodiments of the present disclosure to any particular output, an outdoor use heater may, in some embodiments, have a power output of up to or even more than 12 W/sq-ft. A large area heater may operate using high voltage AC power, according to some embodiments.

A large area heater may be controlled manually or may be fully or partially automated in some embodiments. A large area heater may include an internal or external control box, for example, that allows for control of power, temperature, and/or timing, for example. In some embodiments, a large area heater may be switched "on" by providing power to the heater. For example, a large area heater may be switched on by connecting the heater to a power supply, such as an electrical outlet, or by controlling a wall switch that regulates power to the electrical outlet, for example. In other embodiments, a large area heater may be controlled using any suitable method or combination of methods.

A heater of the present disclosure may, on the other hand, be configured for applications of heating a relatively small area. Generally, a small area heater may be formed into any shape or object. A small area heater may be intended for indoor and/or outdoor use and for a variety of applications. In some embodiments, a small area heater may have a maximum temperature capability or setting that is relatively high, such that it may be used to heat objects such as liquids to high temperatures. In other embodiments, a small area heater may have any suitable temperature capabilities and settings.

In one embodiment, a small area heater may generally be configured to heat containers, such as plastic or glass containers, including but not limited to, vials, test tubes, beakers, cans, jars, pans, cups, or other containers or glassware. In this way, a small area heater may be a useful tool in a laboratory environment, for example, to heat laboratory chemicals or compositions for various purposes such as to cause a reaction, in some cases. A small area heater may additionally or alternatively be useful in a laboratory or other setting to heat glassware, hot plates, and/or as an oven, for example. A small area heater may additionally or alternatively be a useful tool in a kitchen environment, for example, to heat food products for cooking. A small area heater may generally be used to heat food or beverages in some embodiments.

Generally, a small area heater may be configured as a housing for a container such as glassware. The heater may be configured to or be incorporated into a cloth or rubber housing configured to, for example, wrap around or slide over a container. The heater and/or housing may be configured for form fitting over the container or glassware. Small area heaters may be custom sized for different sized containers, for example. In some embodiments, a small area heater may comprise multiple housings to as to accommodate multiple containers. In this way, in some embodiments, a small area heaters may be configured as a docking station for multiple containers. Each of the multiple housings may be controlled independently, or as one or multiple units. In other embodiments, a small area heater may be configured as a mat or other surface with one or more distinct heating zones or micro heating zones, similar to burner plates on a stove top, for example. In some embodiments, a small area heater may include zones or micro zones, where areas divided into square inches, centimeters, millimeters, or smaller may be individually controlled, controlled as one unit, and/or controlled in groups. A small area heater may be connected to other small area heaters, such that multiple heaters may be controlled as a single unit, according to some embodiments. Multiple small area heaters with zones or micro zones may be controlled as a single unit, or the zones or micro zones may be controlled individually or as groups, for example.

A small area heater may use thermal conduction as a primary method to transfer thermal energy from the heater. An upper layer or heated surface such as a top layer of the heater may therefore include materials with a relatively high thermal conductivity. A small area heater may have a maximum temperature of approximately 300 degrees Fahrenheit, according to some embodiments. In other embodiments, a small area heater may have any suitable maximum temperature, as required or desired. A small area heater may generally be configured to operate safely in an ambient temperature range of between 60-80 degrees Fahrenheit, according to some embodiments. In other embodiments, a small area heater may be configured to operate safely in any suitable temperature range. A small area heater may have any suitable power output, and without limiting the various embodiments of the present disclosure, may have an output of up to approximately 3 W/sq-in according to some embodiments. In some embodiments, a small area heater may operate using low DC voltage, such as 24 VDC in some embodiments. However, a small area heater could operate using AC voltage as well.

A small area heater may be controlled as a single unit, or may have multiple zones or micro zones controlled separately or multiple zones or micro zones controlled as a single unit. A small area heater may have an internal or external controller for regulating power to, controlling settings, and/or monitoring sensed data. In some embodiments, a small area heater may have no controller. For example, a small area heater may be powered on by connecting it to a power supply, such as by plugging the heater into a wall outlet, for example. A small area heater may be controlled by or may be responsive to pressure, in some embodiments. That is, the heater, or portions of the heater such as differing zones or micro-zones, may be configured to switch on or warm in response to pressure being applied to the surface of the heater, or to a surface above or near the heater. In such embodiments, the heater may be coupled with a pressure sensor or force sensor such as a force sensitive resistor, piezoelectric sensor, or other suitable force or pressure sensor for example. In this way, a small area heater may switch on and/or warm to a particular temperature when pressure from, for example, glassware, is sensed. In some embodiments, a small area heater may have an integrated controller that may monitor the temperature from one or more sensors on the heater and regulate input power to maintain the temperature at a temperature or within a temperature range.

Figure 3:
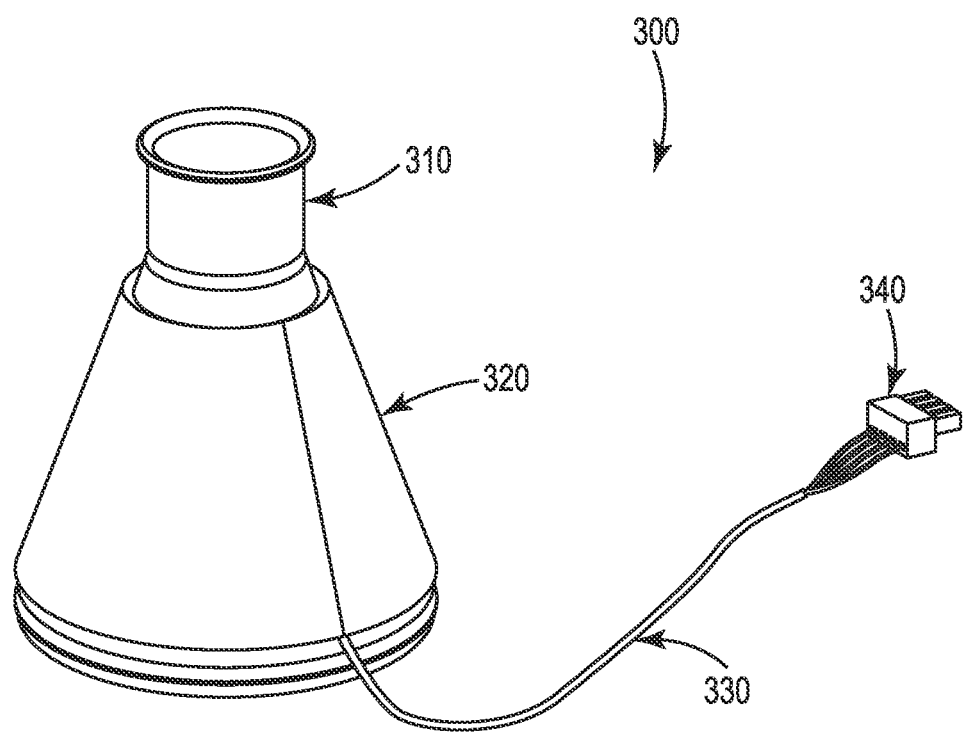
FIG. 3 is a perspective view of a resistive heater according to some embodiments of the present disclosure.
Figure 4:
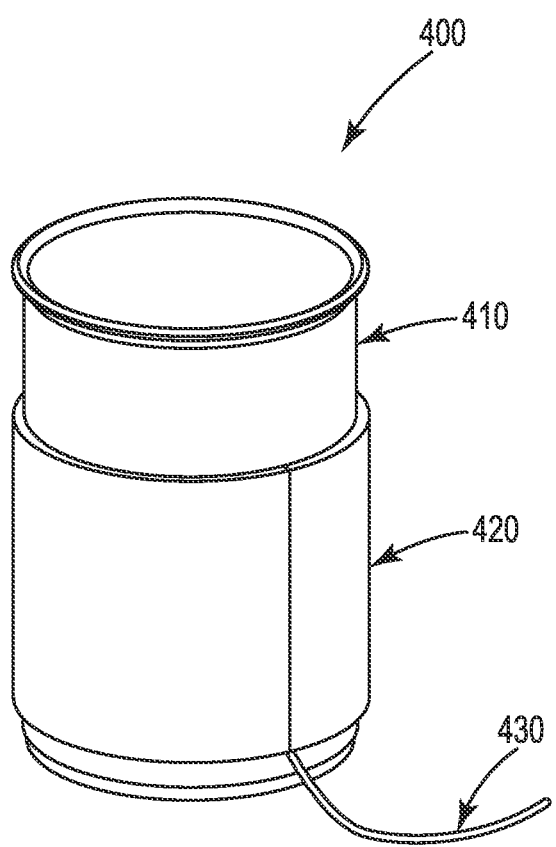
FIG. 4 is a perspective view of a resistive heater according to some embodiments of the present disclosure.

As shown for example in FIG. 3, one embodiment of a small area heater 300 may be configured to generally wrap around a container 310 as a form fitting sheath 320. The wrap or sheath 320 may have a heating surface on its interior side, such that the heating surface makes contact with the container 310. In some embodiments, an exterior side of the sheath 320 may be thermally and/or electrically insulating, such that the container 310 with attached sheath may be touched or picked up, for example. When in operation, the sheath 320 may apply thermal energy to the exterior surface of the container 310. The sheath 320 may contain a conductive layer that is warmed or heated when the heater 300 is connected to a power supply. A wire or interconnect 330, including a connector 340, may connect the sheath 320 to a power source and/or controller. The connector 340 may be a plug, jack, or any suitable connector. FIG. 4 shows an additional embodiment of a small area heater 400 configured to wrap around a container 410 as a form fitting sheath 420, with an interconnect 430.

Figure 5:
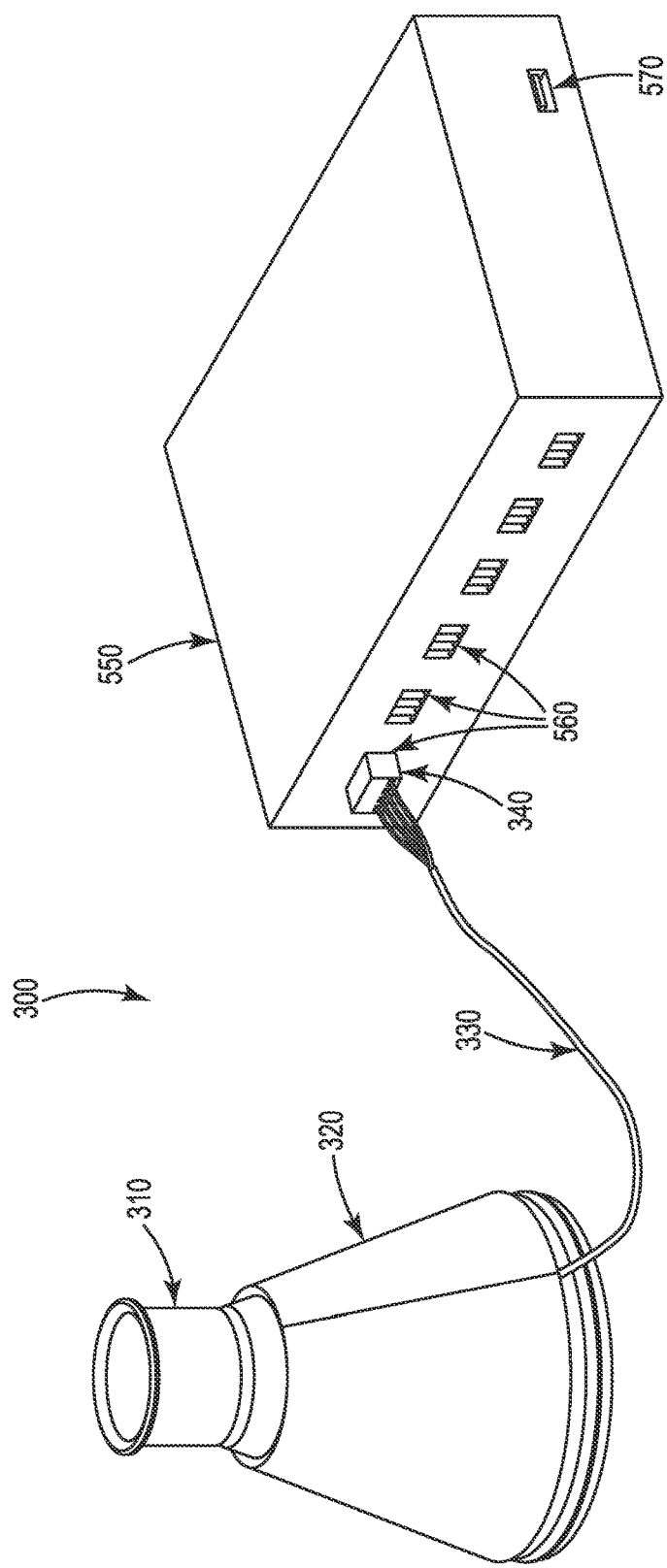
FIG. 5 is a perspective view of the resistive heater of FIG. 3, connected to a controller according to some embodiments of the present disclosure.

As shown in FIG. 5, the small area heater 300 may connect to a controller 550. In some embodiments, the connector 340 may couple to a port 560 of the controller 550. In some embodiments, as shown in FIG. 5, a controller 550 may have multiple ports 560 for receiving multiple connectors 340, in some embodiments. In this way, a controller 550 may be configured to control and/or monitor multiple heaters. In some embodiments, the multiple heaters may be controlled independently, or in other embodiments, the multiple heaters may be controlled as a single unit. The controller 550 may, in some embodiments, provide for individual or unit control of heating zones or micro heating zones on the one or more heaters. The controller 550 may be a power supply for the heater 300, in some embodiments. In other embodiments, the controller 550 may connect to a power source, thereby providing a power connection for the heater 300. Or in some embodiments, the heater 300 may separately connect to a power supply. While shown external to the heater 300, the controller 550 may be internal to or integrated within the heater 300 in some embodiments. The controller 550 may have additional ports 570 or plugs for connecting to a power supply, computer, device, or other systems.

Figure 6:
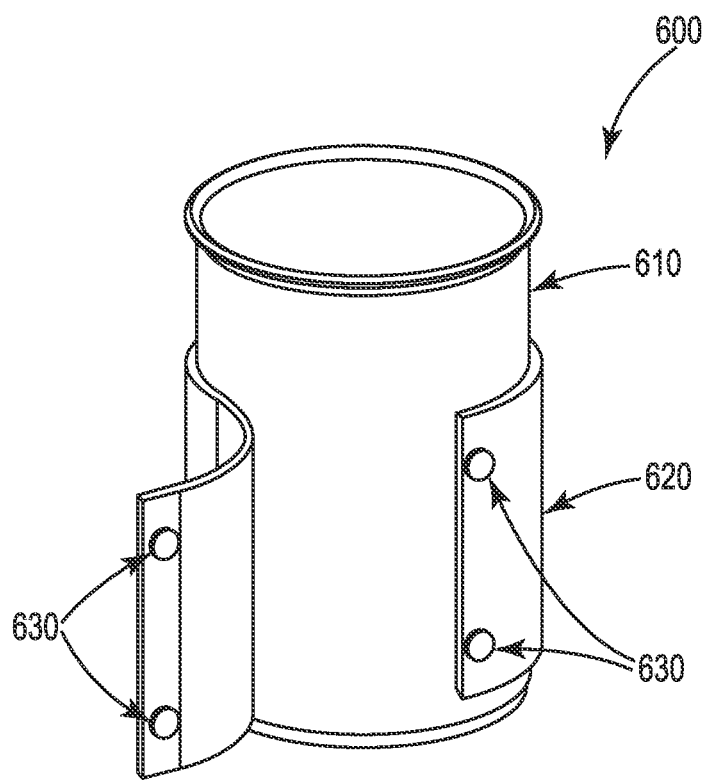
FIG. 6 is a perspective view of a resistive heater according to some embodiments of the present disclosure.

FIG. 6 illustrates one embodiment of a small area heater 600 of the present disclosure, configured to wrap around a container 610 as a form fitting sheath 620. As additionally shown in FIG. 6, the sheath 620 may have a closure mechanism such as one or more snaps 630. Other closure mechanisms such as one or more ties, zippers, pull strings, magnets, or other suitable mechanisms may be used in other embodiments. Such mechanisms may allow for the sheath 620 to be substantially form fitting to the container 610, while still providing for relative ease of application and removal of the sheath.

In some embodiments, a small area heater may be integrated into a comprehensive laboratory system, wherein the system may sense various properties. A comprehensive laboratory system may have one or more heaters for one or more containers. The one or more heaters may be a housing, wrap, or docking station for the one or more containers, such as test tubes or flasks, for example. The system may be placed on the one or more containers, or in some cases the one or more containers may be placed into the system, depending on the system configuration. The system may provide for heating the one or more containers, for example, to cause chemical reactions in some cases. In addition to providing heat, the system may provide sensors for sensing such properties as temperature, color, turbidity, stir rate, conductivity, phase separation, mass, chemical bonding, chemical nature, refractive index, off gassing, or heat flow of the chemicals or other materials in the containers. The system may include one or more temperature sensors for sensing, for example, the temperature of the heating surface of the heater, the temperature of the conductive layer of the heater, and/or the temperature of the material in the container. For sensing such properties or other properties, the system may include sensors such as, but not limited to, a thermocouple, thermistor, thermometer, spectroscopy, spectrophotometer, mass balance, mass spectronomer, flame ionization detector, or others. Additionally or alternatively, a laboratory system may measure differential scanning calorimetry to determine heat flow, electrical resistance to determine conductivity, and rotations per minute of a stir bar to determine a stir rate. Any of such sensors may be located in or on individual heating wraps or housings, in or on a docking station, or externally.

In such a comprehensive laboratory system, control of the one or more heaters may be at least partially automated. A controller may control the one or more heaters based on information received from one or more sensors. For example, the one or more heaters may turn on, off, and/or heat to a temperature or temperature range based on timing or on sensed properties or events. For example, using feedback from various sensors, a heater may automatically heat a container to a temperature in order to cause a reaction in the materials within the container, and may turn off or reduce heat once one or more sensors determine that the reaction has completed. Additionally or alternatively, a the system may provide for adjusting heat and/or power input to maintain a material at a temperature, color, mass, or other property. In this way, the temperature of the heater and/or input power may be controlled based on sensed temperature of the heater or material being heated, and/or one or more other sensed properties. Such automated control of temperature or other properties may be provided for one or more heating zones or micro heating zones of one or more heaters, in some embodiments.

A laboratory system may further provide for monitoring and/or recording of measured data, which may be automated. Each of the properties measured may be tracked and recorded in some embodiments. In this way, the laboratory system may provide for data storage and/or may connect directly with a computer, smartphone, or other device via a wired or wireless connection. In some embodiments, a laboratory system may provide for sharing sensed data over a network connection, for example. Such sharing of data may be automated in some embodiments.

It is to be understood that, as used herein, the terms "large area heater" and "small area heater" are used merely as a naming convention and are in no way limiting. A heater of the present disclosure may generally have any suitable size to cover any size area, and may be used for any suitable purpose, including but not limited to those described above.

Some additional applications in which a resistive heater and/or composite of the present disclosure may be used include, but are not limited to: heating electronics or temperature sensitive components within electronics; agriculture, such as heating livestock pens, greenhouses, flower pots or beds, hoses or lines to prevent freezing, or irrigation systems; aerospace, such as deicing wings or planes or other aeronautic vehicles, warming hydraulics, deicing helicopter blades, or heating hydraulic fluid; automotive, such as heating washing fluid, seats, steering wheels, or hydraulic or power steering fluid; deicing wind turbine blades; heat curing or drying various substances such as epoxy, cement, or paint; nautical, such as deicing decks, defogging windows, warming cabins, or warming shipping containers, heating walls in various settings; or pre-heating engines such as snow blower engines. A resistive heater and/or composite of the present disclosure may be incorporated into wearable heaters, such as incorporated into gloves, hats, jackets, shoes or shoe inserts, goggles, helmets, pants, or jumpsuits, for example. In such embodiments, a heater of the present disclosure may be configured as a cloth layer within the wearable device, with an electrical connection outside the wearable device, allowing the device to be plugged into a power supply. In some embodiments, such as in the case of hearable heaters for example, the heater may be configured to integrate into or interface with external electrical systems, such as motor vehicles, snowmobiles, building power supplies, or other systems. These and other examples may take various forms and may use various sources of power. For example, in the case of wearable heaters, the composite of the present disclosure may be incorporated into a wearable fabric, and the wearable item may be plugged into a vehicle auxiliary outlet for example. In some embodiments, a composite of the present disclosure may be incorporated into or developed as an epoxy coating or other generally pourable and/or spreadable material, which may be spread, for example, over an outdoor or indoor floor surface, such as a garage floor. In some embodiments, for example, the epoxy coating, including the composite, may be poured or spread over an electrical grid connected to a power supply, such as a building electrical system.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:

1. A pourable composite formulation that is viscous prior to curing or drying, the pourable composition comprising:
   65-85% by weight of a matrix material;
   1-15% by weight of carbon nanotubes;
   1-15% by weight of carbon fibers; and
   1-15% by weight of graphite flakes.

2. The composite formulation of claim 1, further comprising more than 0% and up to 5% by weight of zinc oxide.

3. The composite formulation of claim 2, further comprising more than 0% and up to 5% by weight of stearic acid.

4. The composite formulation of claim 2, further comprising more than 0% and up to 5% by weight of a defoaming agent.

5. The composite formulation of claim 1, wherein the matrix material comprises a synthetic polymer.

6. The composite formulation of claim 5, wherein the synthetic polymer is butyl rubber.

7. The composite formulation of claim 6, wherein the butyl rubber is chlorobutyl rubber.

8. A resistive heater comprising:
   an electrically non-conductive substrate layer;
   an electrically and thermally conductive layer comprising a matrix material and a conductive filler over the substrate layer;
   a first electrically non-conductive layer over the conductive layer, and having at least a portion that is thermally conductive;
   a second electrically non-conductive layer beneath the substrate layer; and
   a pair of electrical connectors connected to the conductive layer.

9. The resistive heater of claim 8, wherein the second electrically non-conductive layer is substantially thermally non-conductive.

10. The resistive heater of claim 8, wherein the conductive filler comprises carbon nanotubes.

11. The resistive heater of claim 10, wherein the conductive filler further comprises at least one of carbon fiber and graphite flake.

12. The resistive heater of claim 8, wherein the resistive heater is configured to at least partially wrap around a glass container.

13. The resistive heater of claim 8, further comprising an opening configured to receive a glass container.

14. A resistive heater comprising:
   a conductive layer comprising a matrix material and a conductive filler;
   a substrate layer;
   a pair of connectors connected to the conductive layer;
   an opening configured to receive a glass container; and
   one or more sensors for detecting one or more properties of contents of the glass container.

15. A method for manufacturing a resistive heater, the method comprising:
   forming an electrically and thermally conductive layer over an electrically non-conductive substrate layer, the conductive layer comprising a matrix material and a conductive filler;
   forming a first electrically non-conductive layer over the conductive layer, the first electrically non-conductive layer having at least a portion that is thermally conductive;
   forming a second electrically non-conductive layer beneath the substrate layer; and
   electrically connecting the conductive layer to a controller via one or more electrical conductors, wherein the controller regulates power to the resistive heater.

16. The method of claim 15, wherein the conductive filler comprises carbon nanotubes.

17. The method of claim 16, wherein the conductive filler further comprises carbon fiber.

18. The method of claim 17, wherein the conductive filler further comprises graphite flake.

19. The method of claim 15, wherein the matrix material comprises chlorobutyl rubber.

20. The resistive heater of claim 8, wherein the conductive filler comprises:
   1-15% by weight of carbon nanotubes;
   1-15% by weight of carbon fibers; and
   1-15% by weight of graphite flakes.

* * * * *